United States Patent
Abitbol et al.

[19]

[11] Patent Number: 6,154,969
[45] Date of Patent: Dec. 5, 2000

[54] HOLDING ASSEMBLY FOR LENS MEASURING DEVICE

[75] Inventors: Marc Abitbol, Jerusalem; Yair Tal, Shoham, both of Israel

[73] Assignee: Visionix Ltd., Jerusalem, Israel

[21] Appl. No.: 09/420,400

[22] Filed: Oct. 18, 1999

[30] Foreign Application Priority Data

Oct. 21, 1998 [IL] Israel ........................................ 126694

[51] Int. Cl.$^7$ .................................................. A61B 3/10
[52] U.S. Cl. .................................. 33/200; 33/507; 33/573
[58] Field of Search ........................ 33/200, 28, 507–13, 33/645, 573–533

[56] References Cited

U.S. PATENT DOCUMENTS

| | | |
|---|---|---|
| 1,092,288 | 4/1914 | Pixley ...................................... 33/200 |
| 4,098,002 | 7/1978 | Campbell et al. ........................ 33/200 |
| 4,625,418 | 12/1986 | Joncour et al. ........................... 33/200 |
| 4,693,573 | 9/1987 | Zoueki .................................... 351/204 |
| 5,097,600 | 3/1992 | Brule et al. ................................ 33/28 |
| 5,228,242 | 7/1993 | Matsuyama ................................ 451/8 |
| 5,400,522 | 3/1995 | Kremer et al. ........................... 33/810 |
| 5,515,612 | 5/1996 | Igarashi et al. .......................... 33/200 |
| 5,615,486 | 4/1997 | Igarashi et al. .......................... 33/200 |
| 5,754,272 | 5/1998 | Dimalanta ............................... 351/204 |
| 5,855,074 | 1/1999 | Abitbol et al. ............................ 33/507 |

*Primary Examiner*—Diego Gutierrez
*Assistant Examiner*—Faye Francis
*Attorney, Agent, or Firm*—Ladas & Parry

[57] ABSTRACT

A holding assembly for holding spectacles, having an adjustable grip for fitting around a pair of spectacles. The adjustable grip is slidably mounted to allow alignment one after the other of each lens along a single predetermined axis perpendicular to the plane of the lens, such that the aligned lens has a clear line of sight to a lens measuring device.

8 Claims, 5 Drawing Sheets

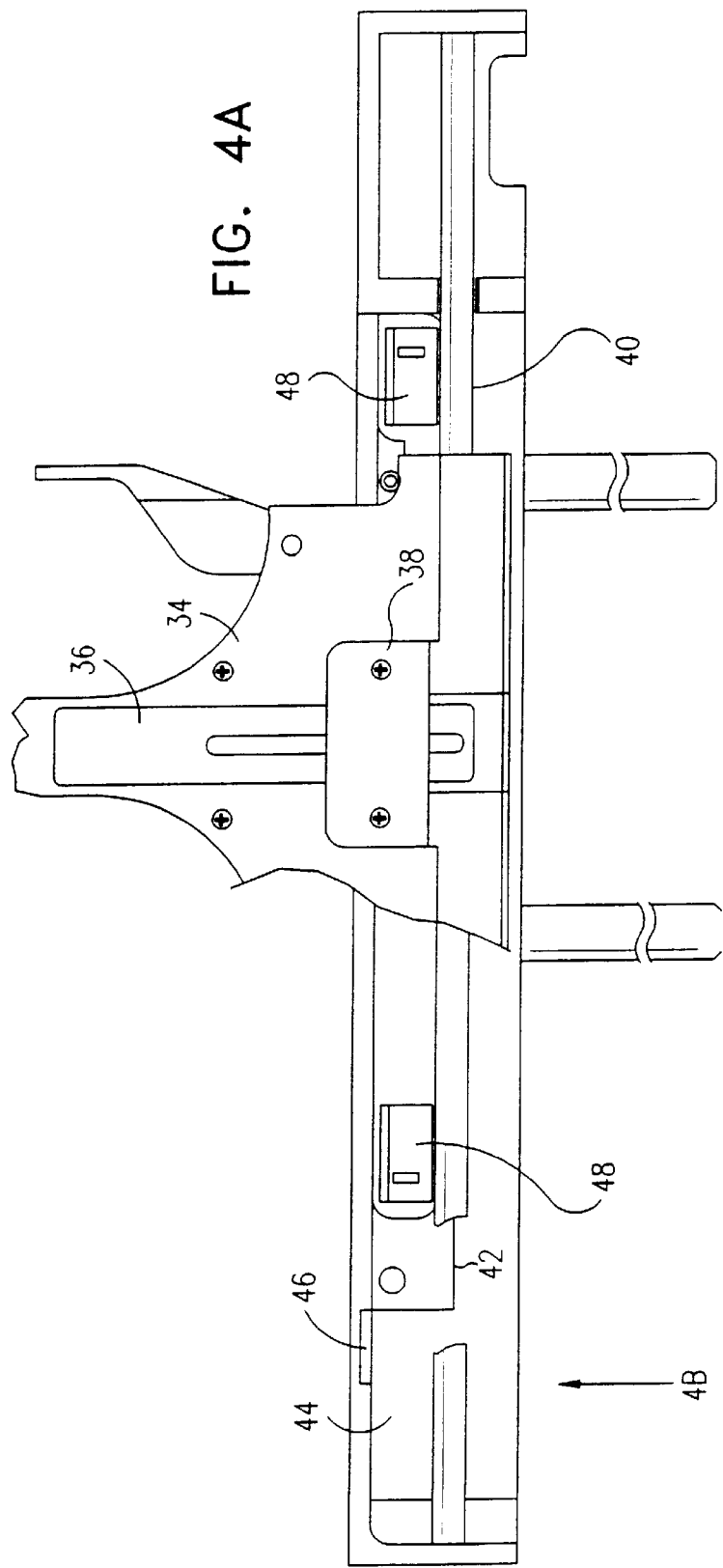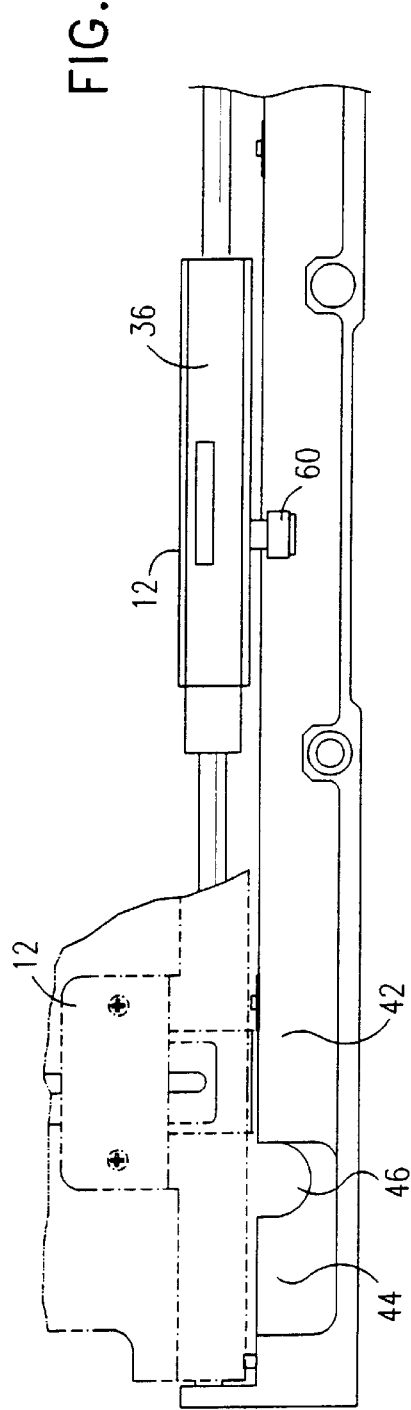

HOLDING ASSEMBLY FOR LENS MEASURING DEVICE

FIELD OF THE INVENTION

The present invention relates to a holding assembly and more particularly but not exclusively to apparatus for the positioning of lenses with respect to an ophthalmic lens measuring device.

BACKGROUND OF THE INVENTION

There are known lens holding assemblies for use with measuring equipment, particularly by opticians, for quickly being able to measure the optical properties of spectacle lenses. A spectacle lens is placed in the holding assembly in the path of a beam, and the deflection of the beam is used to infer the optical properties of the lens. The two lenses of a pair of spectacles are mounted separately onto the holding assembly, and the measuring device is able to measure a single lens at a time.

An example of state of the art lens measuring equipment is to be found in applicant's co-pending U.S. patent application Ser. No. 09/018,360.

SUMMARY OF THE INVENTION

The present invention may provide a holding assembly for holding spectacles in a lens measuring device, for example an ophthalmic lens measuring device. The holding assembly may be slidable and otherwise adjustable so that the lenses of the spectacles car be aligned with a measuring beam, and so that spectacles of different shapes and sizes may be accommodated..

The present invention may, in another aspect, provide a spectacle holding assembly for holding spectacles having different sizes of frames, for measurement while the optical functional areas of their respective lenses are not obscured.

According to a first aspect of the present invention there is provided a holding assembly for holding spectacles, wherein there is provided an adjustable grip for fitting around a spectacle pair having lenses, which adjustable grip is slidably mounted to allow alignment one after the other of each lens along a single predetermined axis perpendicular to the plane of the lens, such that the aligned lens is not obscured with respect to a lens measuring device. The grip is preferably adjustable to accommodate different shapes and sizes of lenses.

Preferably there is provided a position detector for determining the position of the adjustable grip. Preferably the position detector is arranged to indicate which lens of the spectacle pair is currently being measured, that is to say, is currently in the measuring position.

Preferably, the adjustable grip is foldable, for convenience of storage and the like.

The adjustable grip may preferably comprise a nosebridge holder for holding the nosebridge of said spectacle pair. The nosebridge holder preferably comprises an outer bridge piece and an inner bridge piece. The outer bridge piece and the inner bridge piece are slidable to grip the nosebridge between them. In order to facilitate gripping, the inner bridge piece is biased outwardly and the outer bridge piece is mounted within a frictional mounting so as to resist sliding. Thus a nosebridge placed between then is pushed outwardly by the inner bridge piece and held against the outer bridge piece.

The adjustable grip may further comprise rotatable rim holders for gripping the rims of said spectacle pair. The rotatable rim holders are preferably rotatably biased to rotate against said rims so as to hold the rims.

According to a second aspect of the invention there is provided a method of obtaining measurements from a pair of lenses in a spectacle frame, using a measuring device for single lens measurement, having a measurement opening opposite which a lens to be measured is placeable. The method comprises mounting the spectacle frame in a slidable frame holder and moving said frame holder to align each lens, one after the other, with the measurement opening. The frame holder is preferably adjustable so as to be able to hold frames of different shapes and sizes.

BRIEF DESCRIPTION OF THE DRAWINGS

For a better understanding of the invention and to show how the same may be carried into effect, reference will now be made, purely by way of example, to the accompanying drawings in which, FIG. 4A is a rear view of another part of the embodiment of FIG. 1, FIG. 4B is a view from below of the part of FIG. 4A

DESCRIPTION OF THE PREFERRED EMBODIMENTS

Figure 1:
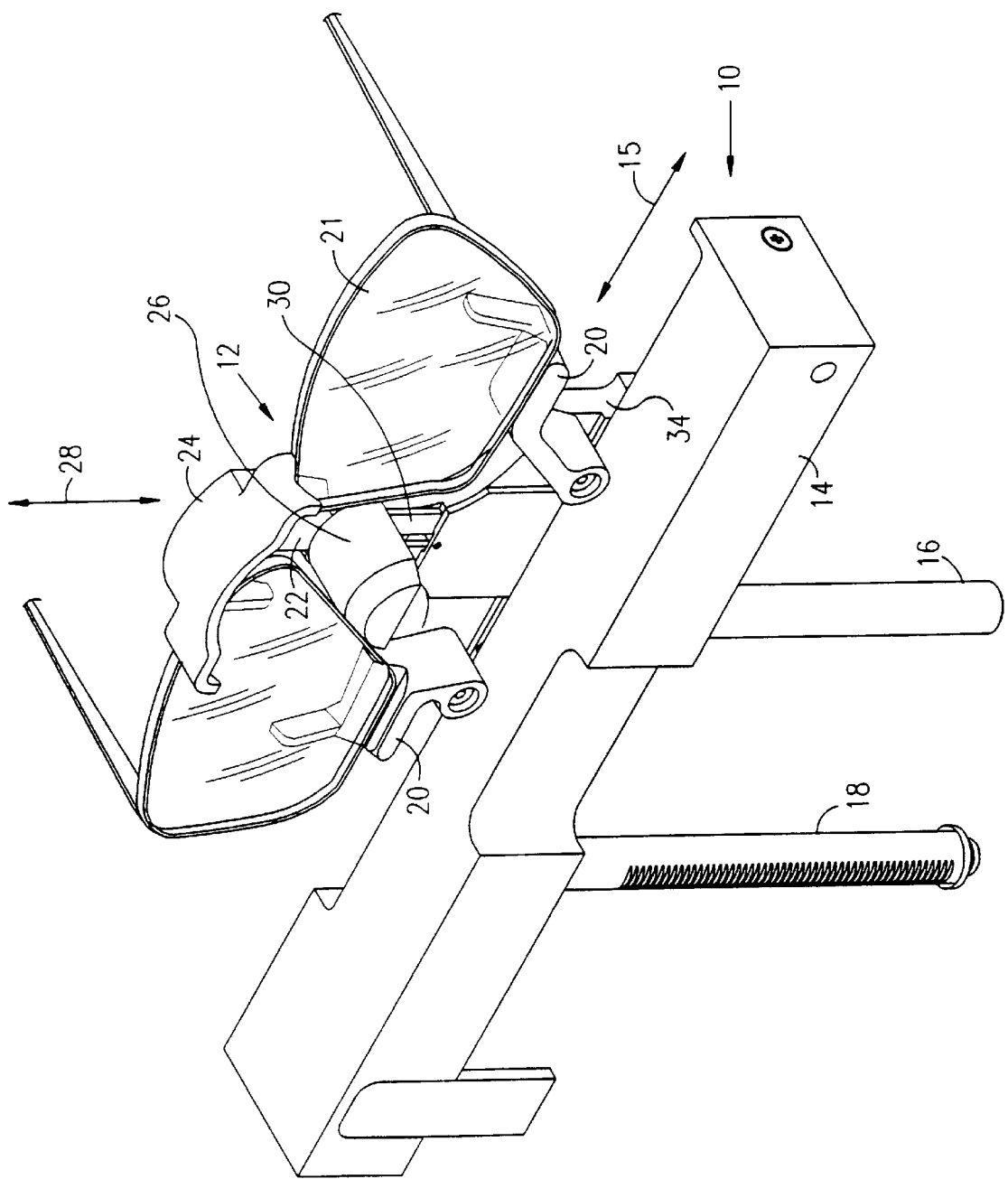
FIG. 1 shows an embodiment of the present invention in a first position.

FIG. 1 shows a holding assembly 10 for holding spectacle frames. The assembly 10 comprises a slidable grip 12 which slides along a platform 14 in the direction arrow 15. Linear sliders 16 and 18 are attached to the mount of the platform for slidable attachment of the assembly 10 to lens measurement apparatus (not shown). The sliders are preferably connected to a gear mechanism on the measurement apparatus which allows the assembly 10 to be positioned accurately with respect to the measurement apparatus.

The slidable grip 12 comprises spring-loaded or otherwise biased rotatable rim holders 20 for gripping the outer rims of a spectacle frame 21. The rotatable rim holders 20 are biased to rotate against said rims so as to grip them.

The slidable grip 12 further comprises a nosebridge holder 22 comprising an outer bridge piece 24 for fitting over the bridge of the spectacle frame 21 and a inner bridge piece 26 for fitting below the bridge of the spectacle frame. The outer bridge piece 24 is slidable vertically in the direction of arrow 28 and is not biased but is tightly held within its mounting so that its slidable motion is arrested by friction. The inner bridge piece 26 is also slidable in the direction of arrow 28 and, indeed is biased in the direction of the arrow 28 with sufficient force to grip a spectacle nosebridge but not to overcome the inertia of the outer bridge piece 24. The inner bridge piece 26 is mounted on slider 30 and the outer bridge piece 24 is mounted on slider 32. Each slider 30 and 32 is in turn mounted within the mount 34 of the slidable grip 12.

Figure 3:
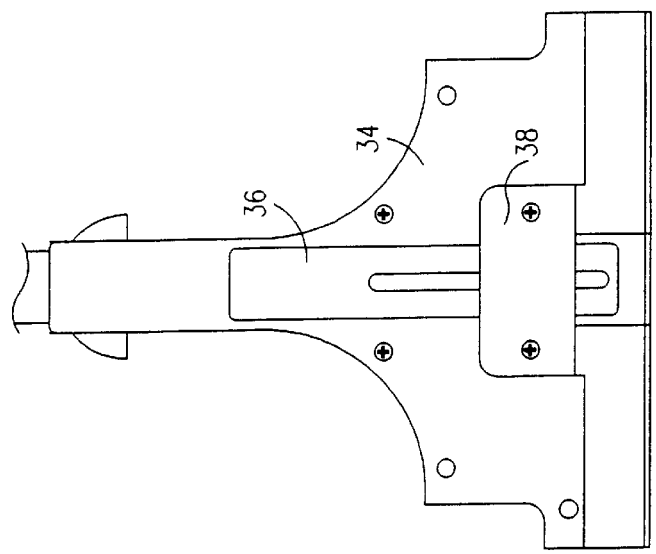
FIG. 3 is a rear view of part of the embodiment of FIG. 1.

FIG. 3 is a rear view of the mount 34 of the slidable grip 12. A channel 36, preferably reaching the entire vertical length of the mount 34, is exposed along most of its length and forms the mounting for slider 32. Plate 38 is placed over the channel 36 and tightened over slider 32 to provide the necessary friction for the outer bridge piece 24.

FIG. 4A is a rear view of the platform 14. A runner 40, preferably of cylindrical cross section, extends across the length of the platform 14 and the slidable grip 12 is slidably and rotatably attached to the runner 40. In addition a bearing 60 or the like (FIG. 4B) may be attached to the back of the slidable grip 12 to run along an interior edge 42 of the platform to prevent rotation of the slidable grip in normal use. Within the platform 14 is an end section 44, into which the interior edge 42 does not extend. When the slidable grip 12 and bearing is within the end section it is free to rotate and can thus be aligned with the mounting pins 16 and 18 for storage and the like. A concave insert 46 may be necessary in the outer wall of the platform 14 to enable the bearing 60 to fit past the outer wall during rotation.

Position sensors 48 are located within the platform to detect the passage of the slidable grip 12. Preferably two sensors are used, one to indicate the positioning of the slidable grip for measurement of the right hand lens and one to indicate the positioning of the slidable grip for measurement of the left hand grip. The sensors would typically be operated by suitably located protrusions 50 (shown in FIG. 6) on the back of the slidable grip 12.

FIG. 4B shows how the adjustable grip runs along the interior edge 42 of the platform 14. The adjustable grip 12 is shown in two positions. 12a is the position shown in FIG. 1 and 12b is the position shown in FIG. 5.

Figure 5:
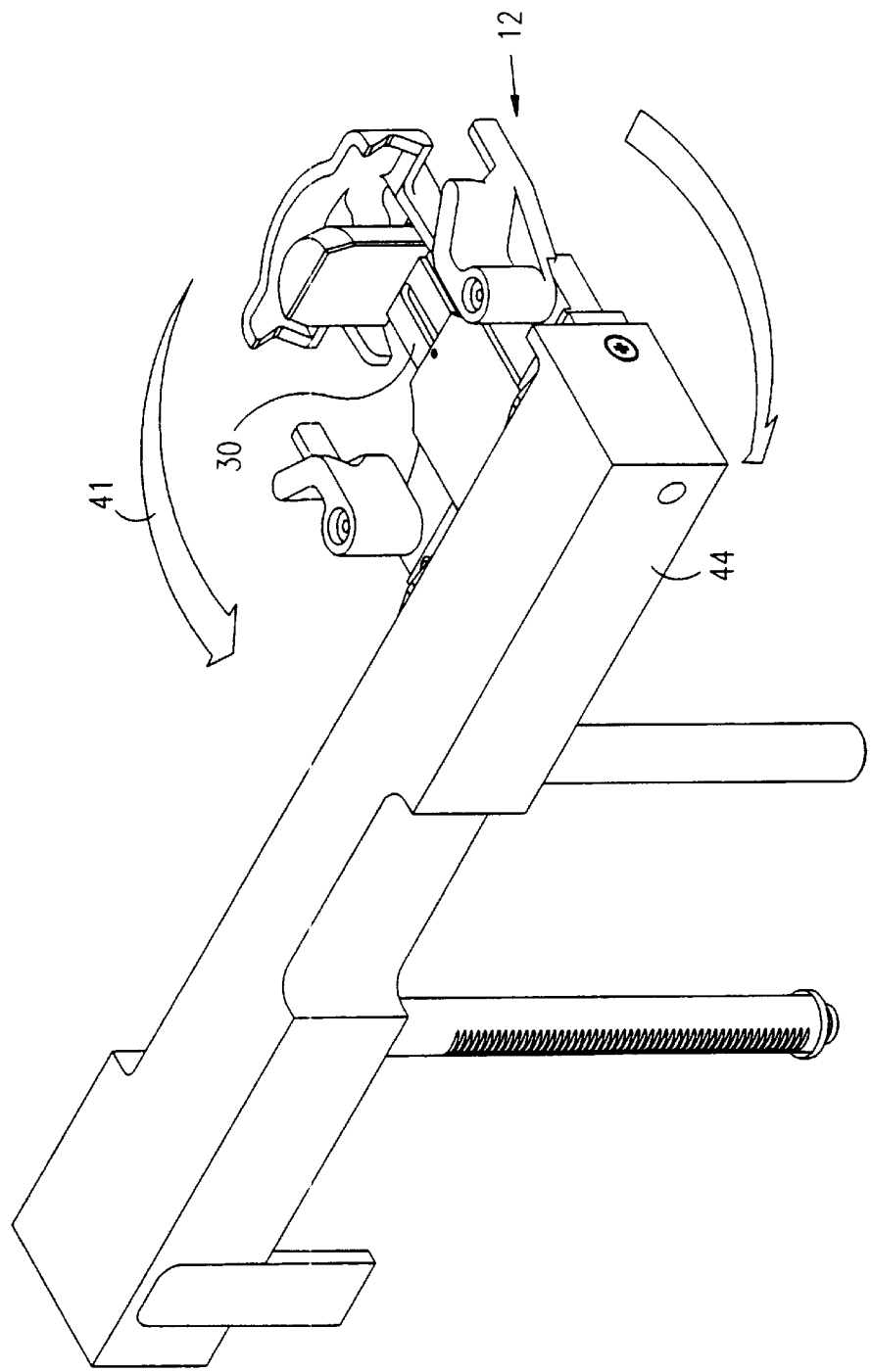
FIG. 5 shows the embodiment of FIG. 1 partly folded away.

FIG. 5 shows the slidable grip 12 within the end section 44 and rotated by 90°, as indicated by arrow 41.

Figure 6:
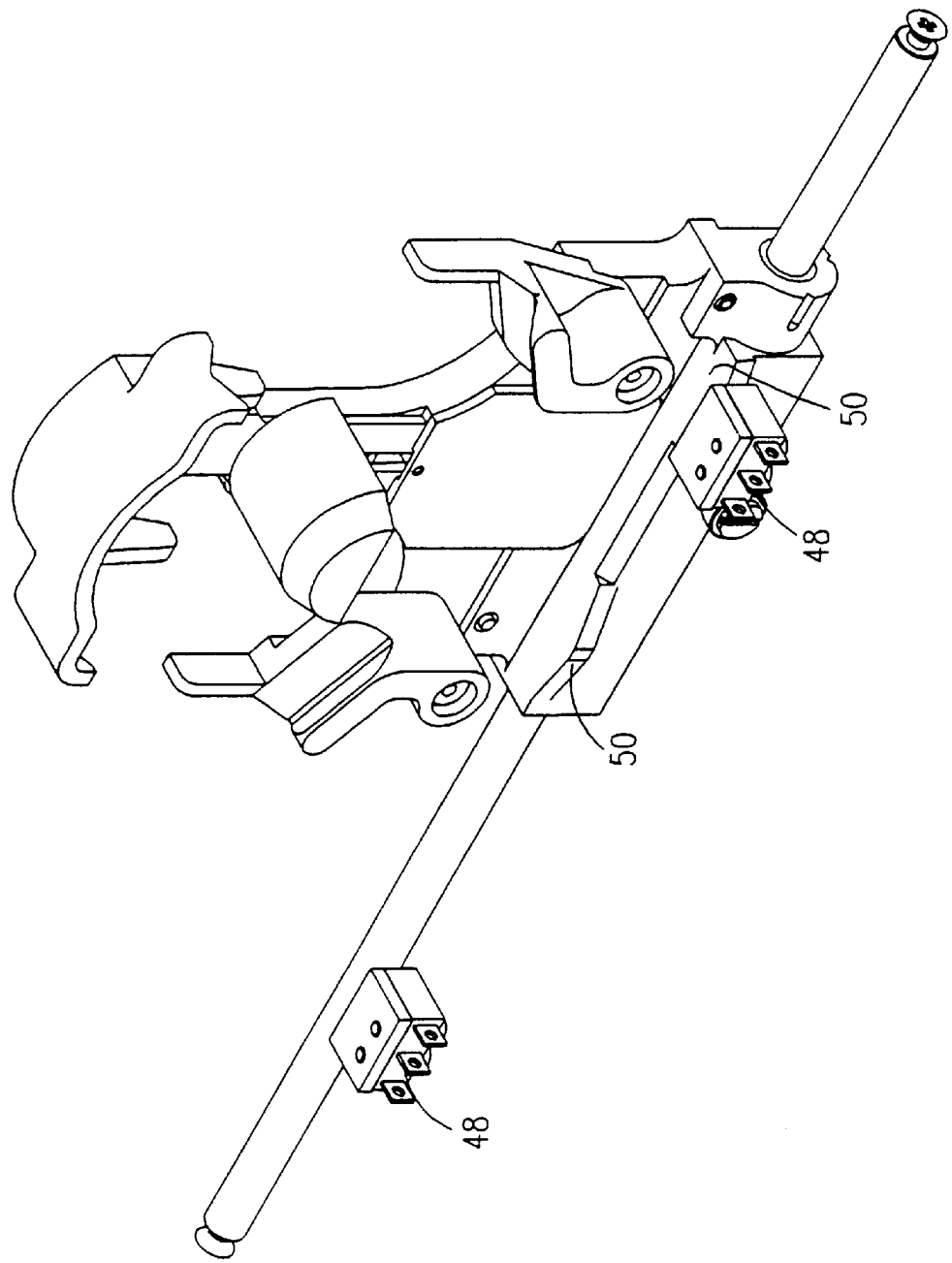
FIG. 6 shows the embodiment of FIG. 1 with a part removed.

FIG. 6 shows the slidable grip 12 mounted on the runner 40 but with the body of the platform 14 removed. The position sensors 48 are shown and the slidable grip 12 is in the correct position for measurement of the right hand lens.

In order to mount a pair of spectacles in the slidable grip it is necessary to raise the outer bridge piece 24 to a height sufficient to accommodate the spectacle frame, to fit the nosebridge between the outer bridge piece 24 and the inner bridge piece 26 and to fit the rims within the rimholders 20. This arrangement is sufficiently flexible to allow for a large range of shapes and sizes of spectacle frames provided the outer bridge member 24 can be raised a sufficient distance and the rim holders 20 are sufficiently large and can be rotated through a sufficiently large angle, preferably in the vicinity of 90°.

Figure 2:
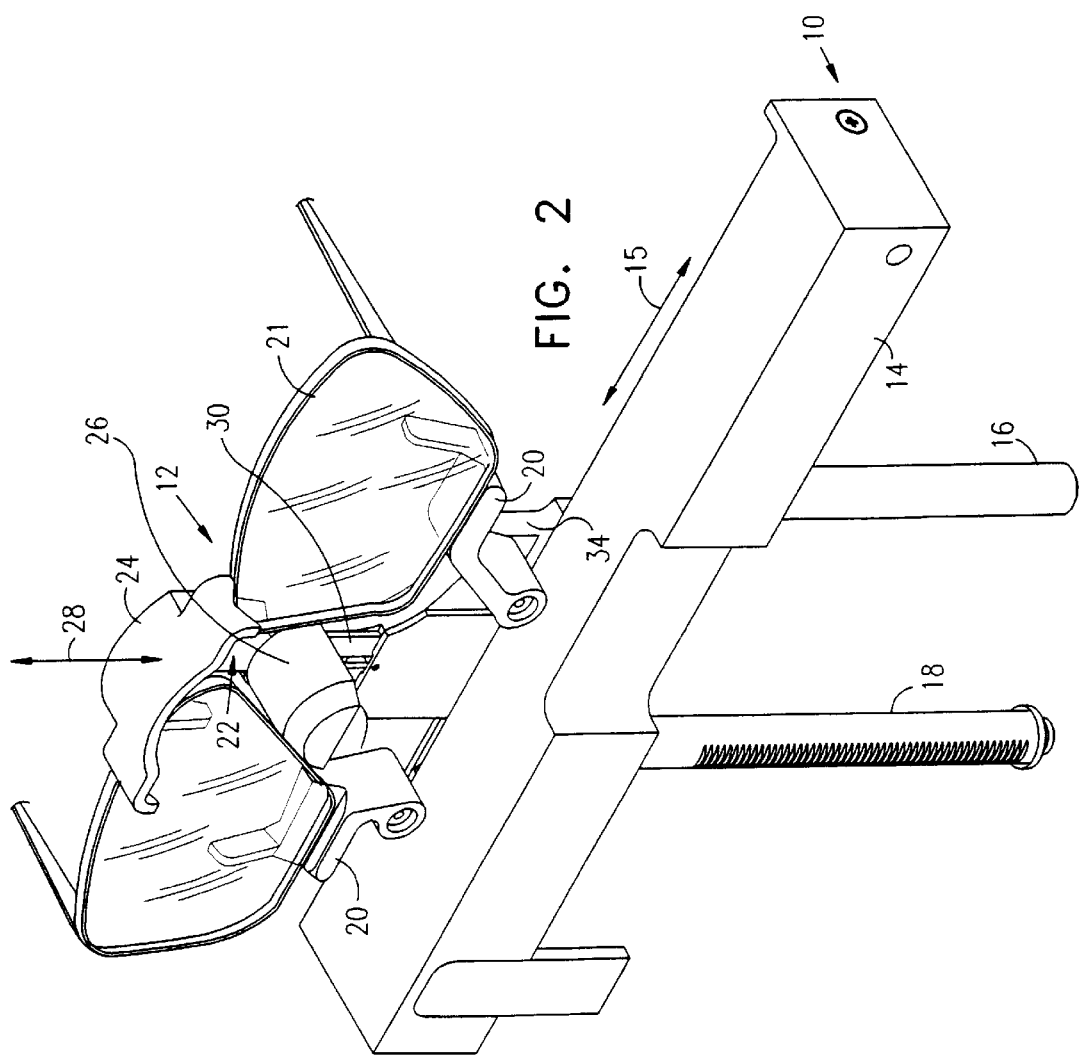
FIG. 2 shows an embodiment of the present invention in a second position.

The slidable grip as a whole is slidable in the direction of arrow 15, along the platform 14 between a first position (shown in FIG. 1) where the right hand lens is aligned with the center of the platform and a second position (shown in FIG. 2) where the left hand lens is aligned with the center of the platform. The center of the platform is aligned with a measuring beam which is used for measurement of the lenses. Thus measurement of two lenses is possible following a single, and relatively simple, mounting action and the pushing of the slidable grip 12 between two positions.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A holding assembly for holding spectacles, comprising an adjustable grip adapted for fitting around a spectacle pair having lenses, said adjustable grip being slidably mounted on a platform to allow alignment one after the other of each lens along a single predetermined axis perpendicular to a plane of one of the lenses, wherein said adjustable grip is rotatably mounted with respect to said platform in first and second orientations, said adjustable grip having a plane and said platform having a plane wherein in said first orientation the plane of said adjustable grip is generally perpendicular to the plane of said platform, and in said second orientation the plane of said adjustable grip is generally parallel to the plane of said platform.

2. A holding assembly according to claim 1 and further comprising a position detector mounted on said platform for determining the position of the adjustable grip.

3. A holding assembly according to claim 2 wherein the position detector is operative to indicate which one of lenses of a spectacle pair is under measurement.

4. A holding assembly according to claim 1, wherein there is provided a nosebridge holder for holding the nosebridge of said spectacle pair, said nosebridge holder comprising an outer bridge piece and an inner bridge piece.

5. A holding assembly according to claim 1, wherein said outer bridge piece and said inner bridge piece are slidable to grip the nosebridge between them.

6. A holding assembly according to claim 5, wherein said inner bridge piece is biased outwardly and wherein said outer bridge piece is mounted within a frictional mounting so as to resist sliding.

7. A holding assembly according to claim 1, wherein said adjustable grip further comprises rotatable rim holders for gripping rims of said spectacle pair.

8. A holding assembly according to claim 7 wherein said rotatable rim holders are rotatably biased to rotate against said rims.

* * * * *